United States Patent
Asakuma et al.

(10) Patent No.: US 10,988,098 B2
(45) Date of Patent: Apr. 27, 2021

(54) AIR BAG MOUNTING INTERIOR TRIM AND PRODUCTION METHOD THEREFOR

(71) Applicant: TOYODA GOSEI CO., LTD., Kiyosu (JP)

(72) Inventors: Shunta Asakuma, Kiyosu (JP); Chiharu Totani, Kiyosu (JP); Hiroshi Iwata, Kiyosu (JP); Hajime Takai, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 89 days.

(21) Appl. No.: 15/895,045

(22) Filed: Feb. 13, 2018

(65) Prior Publication Data

US 2018/0281729 A1    Oct. 4, 2018

(30) Foreign Application Priority Data

Mar. 30, 2017  (JP) .............................. JP2017-066573
Sep. 21, 2017  (JP) .............................. JP2017-181763
Sep. 28, 2017  (JP) .............................. JP2017-188804

(51) Int. Cl.
   *B60R 21/206*    (2011.01)
   *B23K 26/21*     (2014.01)
   (Continued)

(52) U.S. Cl.
   CPC ............ *B60R 21/206* (2013.01); *B23K 26/21* (2015.10); *B60R 21/217* (2013.01); *B60R 21/2165* (2013.01); *B60R 2021/0051* (2013.01)

(58) Field of Classification Search
   CPC ... B60R 21/205; B60R 21/206; B60R 21/215; B60R 21/217; B60R 21/2165; B60R 2021/0051; B60R 2021/21537
   See application file for complete search history.

(56) References Cited

U.S. PATENT DOCUMENTS

| 8,585,083 B2 | 11/2013 | Kanno | |
| 2006/0038390 A1* | 2/2006 | Cho | B60R 21/045 280/752 |

(Continued)

FOREIGN PATENT DOCUMENTS

| JP | 2000-048785 A | 2/2000 |
| JP | 2007-253719 A | 10/2007 |

(Continued)

OTHER PUBLICATIONS

Office Action dated Jul. 14, 2020 in corresponding Japanese Patent Application No. 2017-188804 (and English translation).

(Continued)

*Primary Examiner* — Frank B Vanaman
(74) *Attorney, Agent, or Firm* — Posz Law Group, PLC

(57) ABSTRACT

An air bag mounting interior trim that efficiently pressurizes and welds ribs of a retainer and an instrument panel includes: a retainer having a first wall portion disposed at a deployment side of the air bag; and a panel having a second wall portion opposed to the first wall portion, at the deployment side of the first wall portion. The first and second wall portions each have an inclined face inclined in a pressurizing direction at assembly of the retainer and the panel. The retainer has a first rib protruding along the pressurizing direction from the inclined face of the first wall portion toward the panel side. The panel has a second rib protruding along the pressurizing direction from the inclined face of the second wall portion toward the retainer side. The first and second ribs have weld end faces that face each other in parallel, and that are aligned with the pressurizing direction.

11 Claims, 11 Drawing Sheets

(51) Int. Cl.
*B60R 21/2165* (2011.01)
*B60R 21/217* (2011.01)
*B60R 21/00* (2006.01)

(56) References Cited

U.S. PATENT DOCUMENTS

| | | | |
|---|---|---|---|
| 2007/0026191 A1* | 2/2007 | Field | B29C 65/06 428/119 |
| 2010/0123300 A1* | 5/2010 | Helmstetter | B60R 13/02 280/728.3 |
| 2010/0237592 A1* | 9/2010 | Fukawatase | B60R 21/206 280/728.2 |
| 2012/0299274 A1 | 11/2012 | Kanno | |
| 2013/0134693 A1* | 5/2013 | Tromp | B60R 21/216 280/728.3 |
| 2014/0203540 A1* | 7/2014 | Edeline | B60K 37/00 280/728.3 |
| 2015/0328855 A1* | 11/2015 | Honda | B31D 5/0073 53/403 |

FOREIGN PATENT DOCUMENTS

| | | |
|---|---|---|
| JP | 2010-084642 A | 4/2010 |
| JP | 2010-159035 A | 7/2010 |
| JP | 2011-073469 A | 4/2011 |
| JP | 2012-245859 A | 12/2012 |

OTHER PUBLICATIONS

Office Action dated Aug. 18, 2020 issued in corresponding JP patent application No. 2017-181763 (and English translation).

* cited by examiner

AIR BAG MOUNTING INTERIOR TRIM AND PRODUCTION METHOD THEREFOR

CROSS REFERENCE TO RELATED APPLICATIONS

This application is based on and incorporates herein by reference Japanese Patent Application No. 2017-066573 filed on Mar. 30, 2017, Japanese Patent Application No. 2017-181763 filed on Sep. 21, 2017, and Japanese Patent Application No. 2017-188804 filed on Sep. 28, 2017.

TECHNICAL FIELD

The present invention relates to an interior trim for mounting airbag (hereinafter, air bag mounting interior trim) and a production method therefor.

BACKGROUND ART

Conventionally, an air bag mounting interior trim to be used for air bag devices for vehicles and the like is known (for example, Japanese Laid-Open Patent Publication No. 2012-245859). This air bag mounting interior trim includes: a frame-shaped retainer configured to have a case mounted thereto, the case having formed therein a housing space for housing an air bag; and an instrument panel configured to have the retainer mounted thereto. The retainer is provided with a rib protruding to the instrument panel side. The panel body of the instrument panel is provided with a rib protruding to the retainer side. The retainer and the instrument panel are integrated to each other by the ribs being joined to each other through vibration welding.

In welding ribs on the retainer side and the instrument panel side, the end faces to be welded (hereinafter, weld end faces) of both ribs need to be pressurized by means of a jig. However, in a structure in which the wall portions, of the retainer and the instrument panel, respectively provided with the ribs are inclined with respect to the pressurizing direction, if the weld end face of each rib is formed so as to be parallel to the wall portion of the retainer or the instrument panel and is inclined with respect to the pressurizing direction, the weld end faces of the ribs are not pressurized in a direction perpendicular to the weld end faces. Thus, in such a structure, large welding pressure does not act on the weld end faces, and thus, appropriate welding is not realized, or force generated by a jig needs to be increased so as to cause large welding pressure to act on the weld end faces.

The present invention has been made in consideration of the situation described above. An object of the present invention is to provide an air bag mounting interior trim that allows efficient pressurization and welding of ribs of a retainer and an instrument panel, and a production method therefor.

The present invention is an air bag mounting interior trim including: a retainer having mounted thereto a case housing an air bag, the retainer having a first wall portion disposed at a deployment side with respect to the air bag; and a panel having a second wall portion disposed so as to be opposed to the first wall portion of the retainer, at the deployment side of the air bag with respect to the first wall portion, the panel configured to be welded to the retainer, wherein the first wall portion and the second wall portion each have an inclined face inclined with respect to a pressurizing direction in which the retainer and the panel are moved relative to each other at a time of assembly thereof for welding, the retainer has a first rib protruding along the pressurizing direction from the inclined face of the first wall portion toward the panel side, the panel has a second rib configured to be welded to the first rib, the second rib protruding along the pressurizing direction from the inclined face of the second wall portion toward the retainer side, and the first rib and the second rib respectively have weld end faces, a direction in which the weld end faces face each other in parallel to each other being aligned with the pressurizing direction.

According to this configuration, the retainer is provided with the first rib protruding along the pressurizing direction from the inclined face thereof toward the panel side, and the panel is provided with the second rib protruding along the pressurizing direction from the inclined face thereof toward the retainer side. The first rib and the second rib respectively have weld end faces, a direction in which the weld end faces face each other in parallel to each other being aligned with the pressurizing direction for assembly of the retainer and the panel. In such a structure, even in the case of the ribs formed at the inclined faces of the retainer and the panel, the ribs are pressurized in a state where the weld end faces thereof face each other in parallel to each other, and pressurized along the facing direction. Therefore, the ribs of the retainer and the panel are efficiently pressurized to be welded to each other.

The present invention is an air bag mounting interior trim including: a retainer having a lid composed of two flaps; a case configured to be mounted to the retainer; an air bag housed in a space defined by the retainer and the case; an inflator configured to supply inflation gas to the air bag; and a panel being located to a rear side of the flaps, the panel having an opening portion including two doors respectively being regions defined by tear lines provided at positions corresponding to borders of the flaps, the panel being welded to the flaps, the air bag mounting interior trim including: first weld ribs each protruding forward along a pressing direction at a time of assembly for welding from a face at a front side, with respect to the panel, of the opening portion defined by the tear lines, each first weld rib extending in a vehicle width direction, an end of each first weld rib being formed as a perpendicular plane extending in a direction orthogonal to the pressing direction; and second weld ribs each protruding rearward along the pressing direction from a face at a rear side of each flap, each second weld rib extending in the vehicle width direction, an end of each second weld rib being formed as the perpendicular plane and welded to the end of corresponding one of the first weld ribs.

According to this configuration, the first weld ribs and the second weld ribs each have a perpendicular plane at an end at a corresponding side in the front-rear direction, and thus, are reliably welded to each other by being pressurized in the front-rear direction.

The present invention is an air bag mounting interior trim production method in which the retainer and the panel of the air bag mounting interior trim described above are assembled to each other, the production method including: a first step of melting, by means of an infrared welding machine, a leading end of the first rib of the retainer and a leading end of the second rib of the panel; and a second step of, by use of a jig, moving the retainer and the panel relative to each other in the pressurizing direction in which the retainer and the panel come closer to each other, thereby to bring the first rib and the second rib into contact with each other in a direction perpendicular to the weld end faces and pressurize the first rib and the second rib.

According to this configuration, by use of a jig, the first rib of the retainer having a molten leading end and the second rib of the panel having a molten leading end are brought into contact with each other in a direction perpendicular to the weld end faces and pressurized in a state where the weld end faces face each other in parallel to each other. Therefore, the ribs of the retainer and the panel are efficiently pressurized to be welded to each other.

DETAILED DESCRIPTION OF THE INVENTION

Hereinafter, specific embodiments of an air bag mounting interior trim and a production method therefor according to the present invention are described with reference to FIG. 1 to FIG. 11. In the embodiments below, "front", "rear", "left", "right", "up", and "down (lower)" directions used in description correspond to "front", "rear", "left", "right", "up", and "down (lower)" directions for an occupant sitting in a vehicle while facing forward of the vehicle.

FIRST EMBODIMENT

Figure 5:
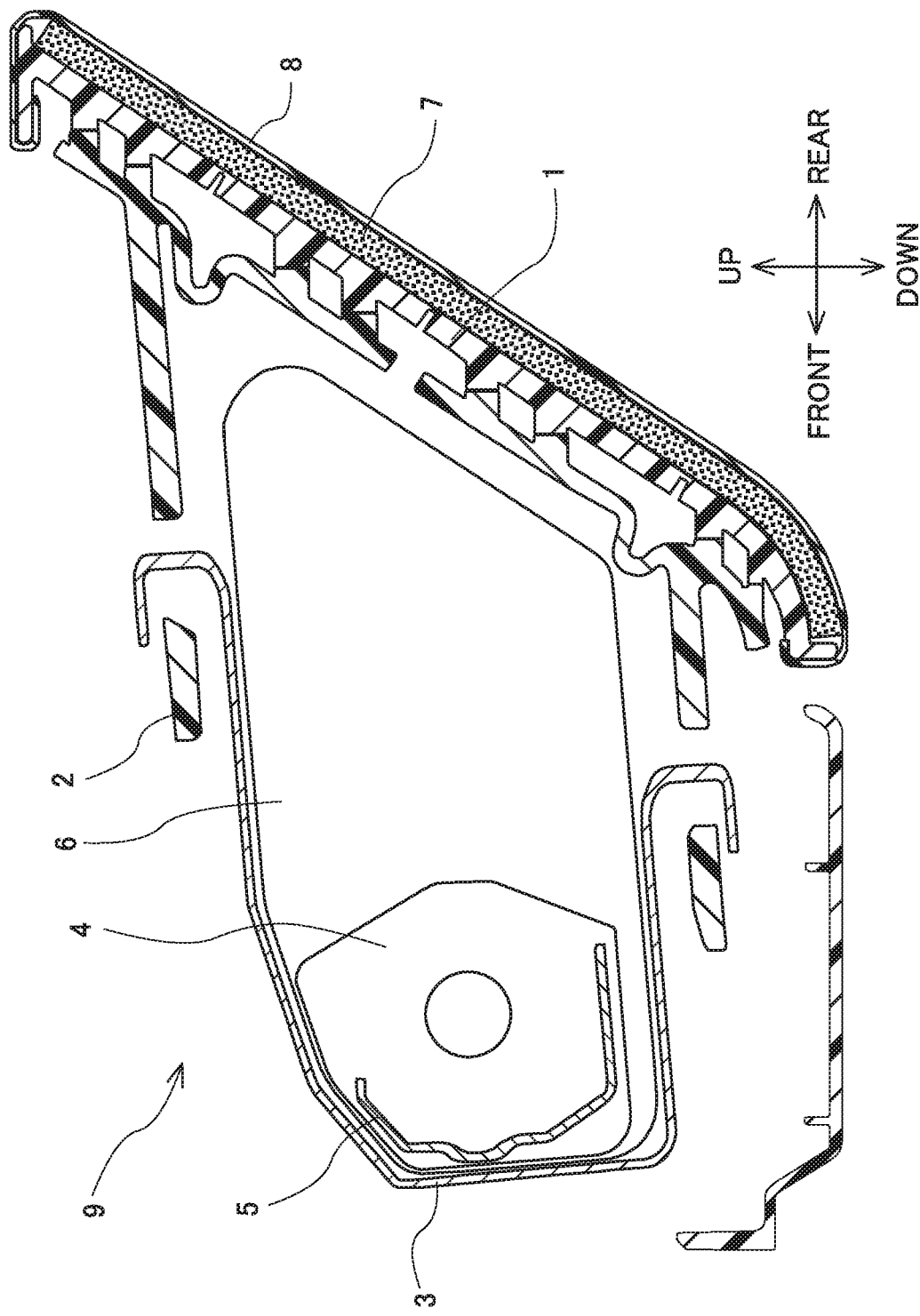
FIG. 5 is a cross-sectional view of the air bag mounting interior trim along the V-V line in FIG. 4 according to the first embodiment.

An air bag mounting interior trim of the first embodiment is an interior product applied to a knee air bag device 9 for vehicles. As shown in FIG. 5, the knee airbag device 9 for vehicles is provided such that a retainer 2 is integrated with an instrument lower panel base member 1 provided at a front portion in the compartment.

The instrument lower panel base member 1 is mounted so as to be inclined from the rear and upper side for the vehicle to the front and lower side for the vehicle.

The retainer 2 is joined to the front side of the inclined instrument lower panel base member 1.

Figure 1:
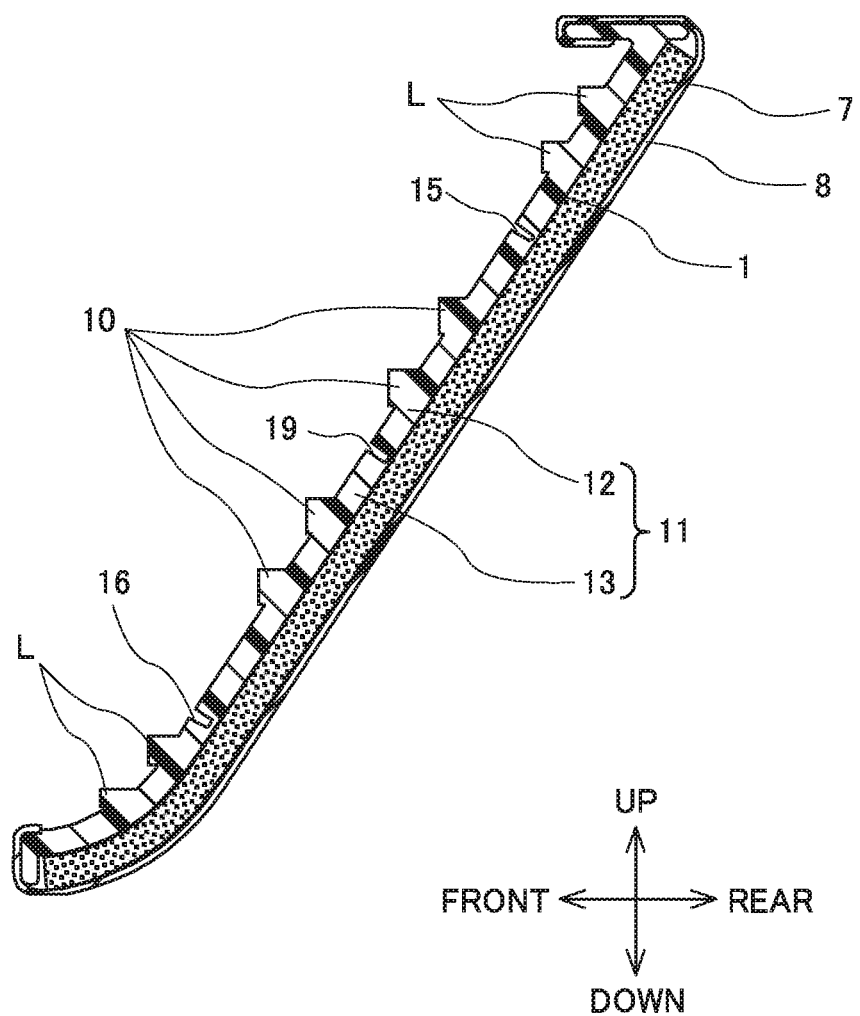
FIG. 1 is a cross-sectional view of an instrument lower panel of an air bag mounting interior trim according to a first embodiment of the present invention.
Figure 4:
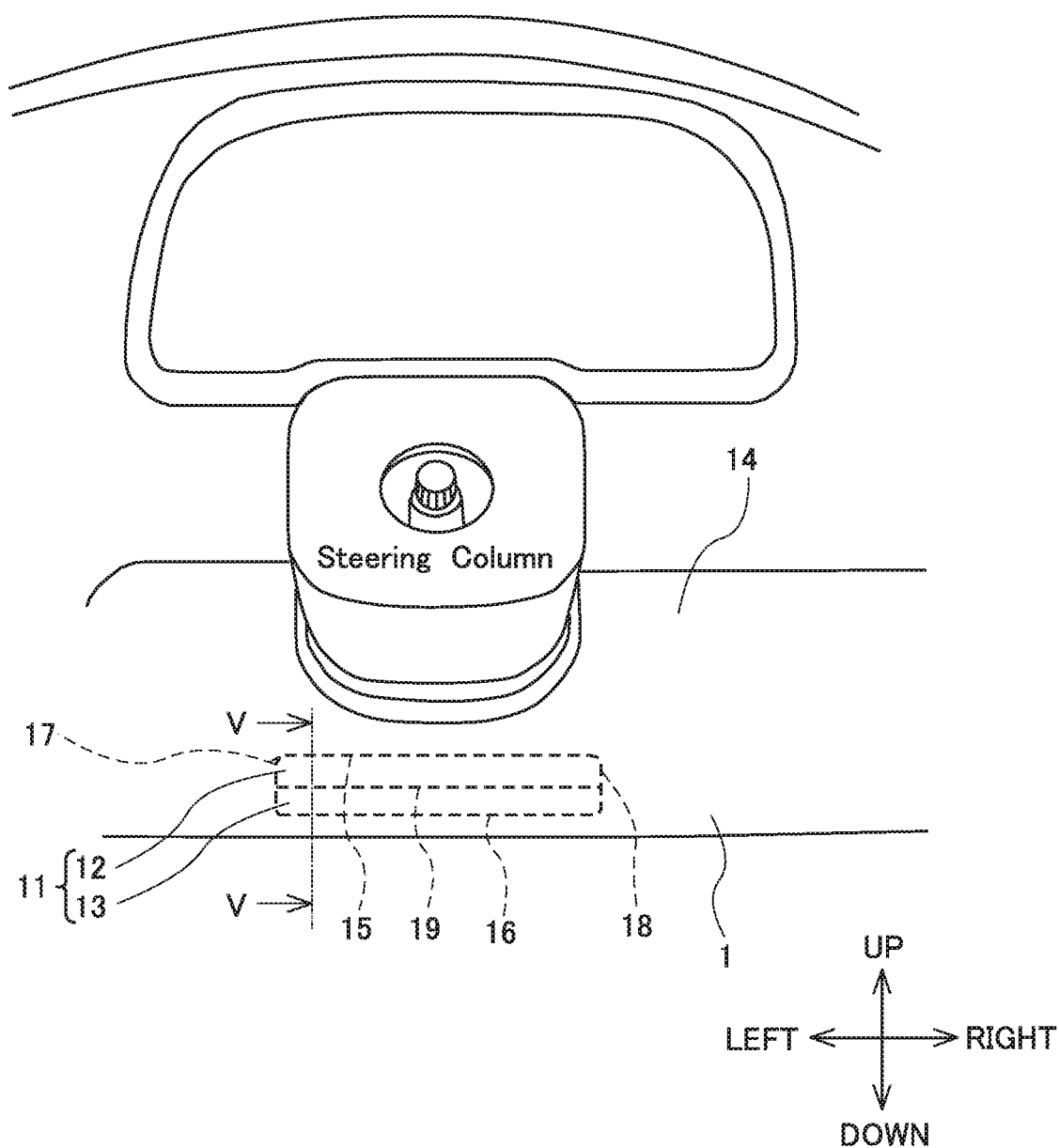
FIG. 4 is a schematic view showing an assembled state of the air bag mounting interior trim viewed from the rear side of the vehicle according to the first embodiment.

Component:
Instrument Lower Panel:

As shown in FIG. 1 and FIG. 4, an instrument lower panel includes: the instrument lower panel base member 1; and a cushion layer 7 and a skin 8 which are joined at the rear side of the instrument lower panel base member 1. The instrument lower panel base member 1 includes: an opening portion 11 and an outer peripheral portion 14 surrounding the opening portion 11. The opening portion 11 is composed of two doors 12 and 13 defined by tear lines 15, 16, 17, 18, and 19 provided in a shape of two rectangles arranged alongside each other, and at a position corresponding to the borders of flaps 22 and 23 of a lid 21 facing rearward of the retainer 2 described later.

The instrument lower panel may be composed only of the instrument lower panel base member 1, without including the cushion layer 7 and the skin 8.

Figure 2:
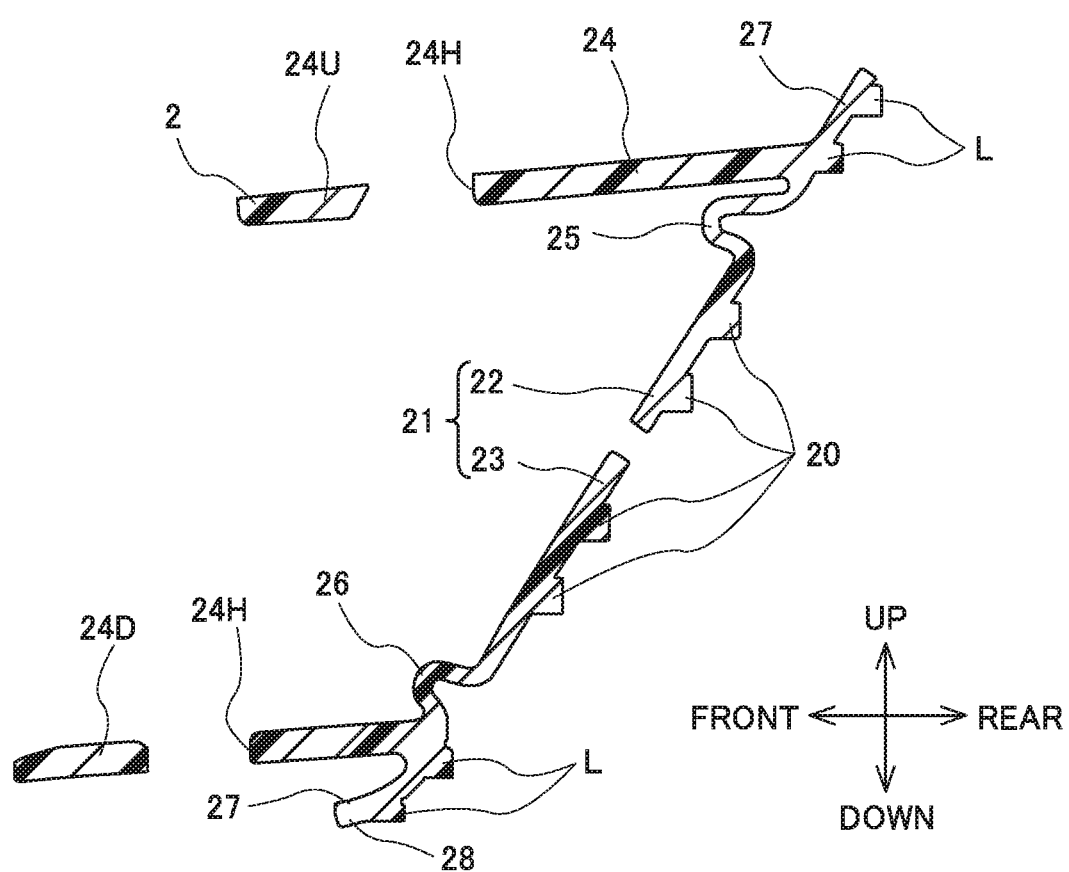
FIG. 2 is a longitudinal cross-sectional view of a retainer of the air bag mounting interior trim according to the first embodiment.

Retainer:

As shown in FIG. 2, the retainer 2 includes: the lid 21 provided in parallel to the back surface of the opening portion 11; a frame portion 24 protruding forward; and a flange portion 27 extending to the outer peripheral side of the frame portion 24 and provided in parallel to the instrument lower panel.

The lid 21 is composed of the upper flap 22 and the lower flap 23, and the flange portion 27 is like a frame formed around the lid 21. The upper flap 22 is coupled through a hinge portion 25 to a rear end of the frame portion 24. Similarly, the lower flap 23 is coupled through a hinge portion 26 to a rear end of the frame portion 24.

Each of the hinge portions 25 and 26 is formed such that the cross-sectional shape thereof is in a "U" shape that is open substantially rearward. The hinge portion 25, 26 is curved toward the opened side thereof. In addition, the thickness, the material, the shape, and the like of the hinge portion 25, 26 are set such that the deployment amount of the flap 22, 23 deploying toward the compartment is restricted in a certain range.

The two flaps 22 and 23 of the lid 21 and the flange portion 27 are in parallel to the instrument lower panel base member 1, and forms a fixing plate portion 28, of the retainer 2, facing toward the front side of the instrument lower panel base member 1.

The borders of the two flaps 22 and 23 correspond to the tear lines 15, 16, 17, 18, and 19, and thus, the flaps 22 and 23 are formed in substantially the same sizes and shapes as the upper door 12 and the lower door 13, respectively.

The frame portion 24 is formed in a tubular shape so as to extend from an inner side portion of the flange portion 27 toward the front in a substantially horizontal direction. Of the frame portion 24, a pair of side wall portions 24U and 24D opposed to each other in the up-down direction of the vehicle have formed therein engagement holes 24H penetrating the side wall portions 24U and 24D in the thickness direction thereof, respectively.

Weld Ribs:

Between the front side of the instrument lower panel and the rear side of the fixing plate portion 28 (at least between the front side of the opening portion 11 and the rear side of the lid 21), first weld ribs 10 and second weld ribs 20 are provided. Each of the first weld ribs 10 extends in the vehicle width direction, protrudes forward from the front side of the opening portion 11, and has an end thereof formed as a perpendicular plane extending in a direction orthogonal to the protruding direction thereof. Each of the second weld ribs 20 extends in the vehicle width direction, protrudes rearward from the rear side of the lid 21, has an end thereof formed as a perpendicular plane extending in a direction orthogonal to the protruding direction thereof, and is configured to be welded to a corresponding one of the first weld ribs 10.

Figure 3:
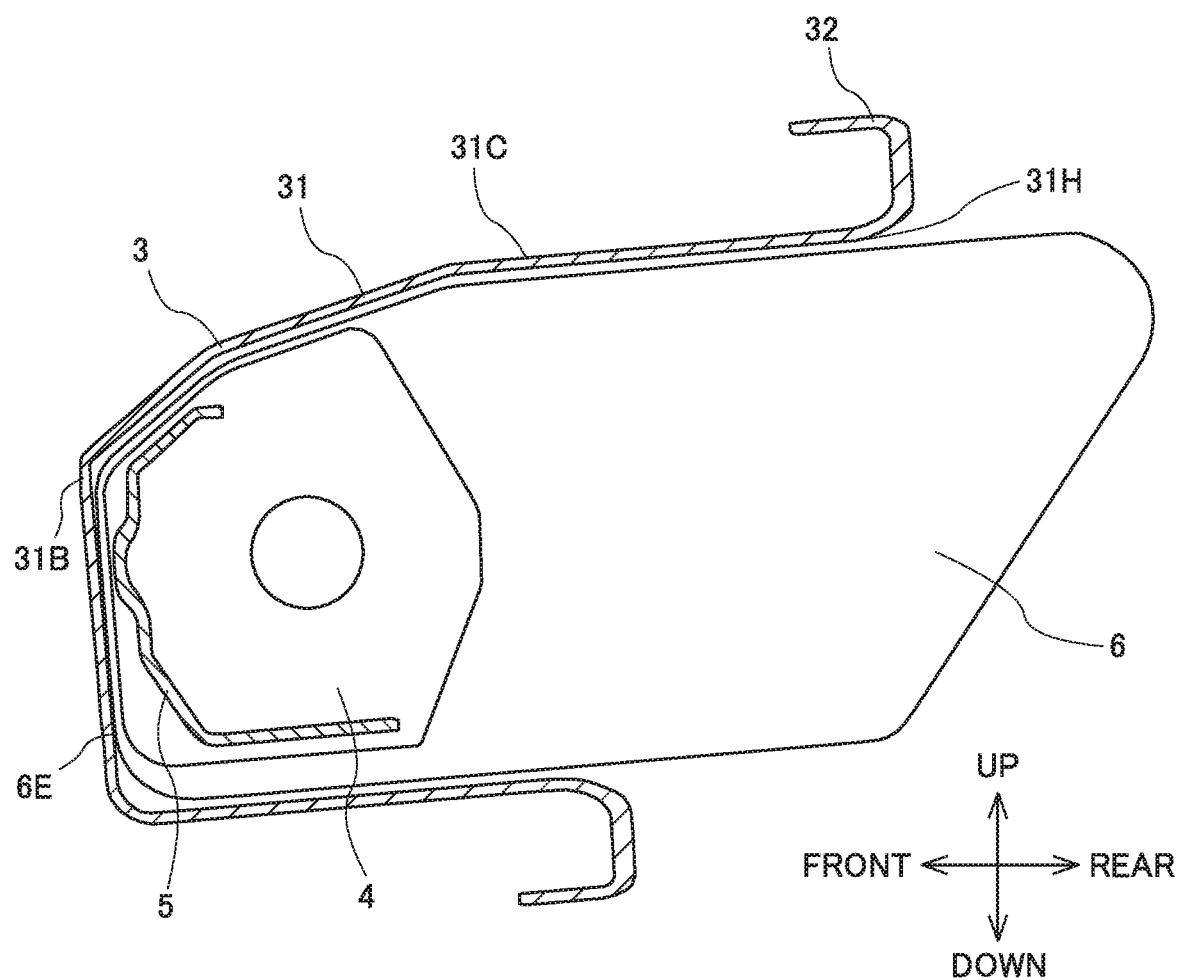
FIG. 3 is a longitudinal cross-sectional view showing a set of an air bag, an inflator, a fixing member, and a case of the air bag mounting interior trim according to the first embodiment.

Case:

A case 3 is provided to the front side of the lid 21 of the retainer 2, and is fixed to the vehicle body through a fixing component not shown. As shown in FIG. 3, the case 3 has a body portion 31 formed in a box shape. The body portion 31 has an opening 31H at the door 12, 13 side, and has a bottom portion 31B at the opposite side to the opening 31H.

The body portion 31 is disposed inside the frame portion 24. A peripheral wall portion 31C is formed in the body portion 31. At ends on the opening 31H side of a pair of side wall portions, of the peripheral wall portion 31C, opposed to each other in the up-down direction of the vehicle, engagement portions 32 are formed, respectively. At the time of assembly, the engagement portions 32 are engaged with the corresponding engagement holes 24H, respectively.

Inflator:

An inflator 4 is fixed in the case 3 by means of a fixing member 5. When a signal outputted from a control device not shown has been inputted, the inflator 4 supplies gas into an air bag 6 such that the air bag 6 is inflated to be deployed.

Air Bag:

The air bag 6 is housed in a folded state inside the case 3, and a proximal portion 6E of the air bag 6 is fixed to the bottom portion 31B.

Welding and Assembly:

The cushion layer 7 and the skin 8 are sequentially mounted to corresponding positions at the rear side of the instrument lower panel base member 1, to form an instrument lower panel.

The ends of the first weld ribs 10 and the ends of the second weld ribs 20 between the front side of the instrument lower panel base member 1 and the rear side of the fixing plate portion 28 of the retainer 2 are correspondingly welded to each other through infrared welding, thereby to reliably integrate the retainer 2 and the instrument lower panel base member 1 to each other, and join the flap 22, 23 and the corresponding door 12, 13 together, in particular.

At this time, the instrument lower panel is fixed to a fixture, and the flaps 22 and 23 are both pressed against the instrument lower panel base member 1 in a direction along the frame portion 24 (i.e., substantially horizontal front-rear direction) by means of a pressing jig disposed in the frame portion 24 of the retainer 2. At the same time, weld ribs L disposed around the first weld ribs 10 and weld ribs L disposed around the second weld ribs 20 are also welded to each other.

At this time, each of the ribs 10, 20, and L extends in the pressing direction, i.e., a substantially horizontal front-rear direction, and the end thereof is formed as a perpendicular plane extending in a direction orthogonal to the pressing direction. Thus, each of the ribs 10, 20, and L is reliably welded.

Then, a fixing device not shown is mounted to the case 3 having fixed thereto the inflator 4, the fixing member 5, and the air bag 6 in a folded state. Then, the engagement portions 32 are engaged with the engagement holes 24H of the retainer 2, whereby the knee air bag device 9 is completed.

Operation and Effect:

Next, operation and effect of the embodiment of the present invention are described.

According to the knee airbag device 9, in order to restrain an occupant when necessary, if the control device outputs a signal to the inflator 4, the inflator 4 supplies gas to the air bag 6, and upon reception of the supply of the gas, the air bag 6 begins to be inflated to be deployed toward the inside of the compartment. Accordingly, the flaps 22 and 23 of the retainer 2 are deployed, and at the same time, receive pressure from the air bag 6 at the back surfaces of the flaps 22 and 23. Thus, the flaps 22 and 23 rotate around the hinge portions 25 and 26 through elastic deformation of the hinge portions 25 and 26, to be opened toward the compartment side.

At the same time, the two doors 12 and 13, of the opening portion 11, welded to the flaps 22 and 23 tear open from the tear lines 15, 16, 17, 18, and 19, to be deployed together with the flaps 22 and 23, whereby the air bag 6 is smoothly deployed into the compartment.

In the first embodiment described above, the lid 21 and the flange portion 27 of the retainer 2 correspond to "first wall portion" described in claims, the instrument lower panel base member 1 corresponds to "second wall portion" described in claims, and each rib of the second weld ribs 20 and the weld ribs L correspond to "first rib" described in claims, and each rib of the first weld ribs 10 and the weld ribs L correspond to "second rib" described in claims.

In the first embodiment described above, the air bag mounting interior trim is applied to the knee air bag device 9 for vehicles. However, the present invention is not limited thereto. The air bag mounting interior trim may be applied to an air bag device for vehicles, the air bag device being disposed to the front side with respect to the upper body of a target occupant. Alternatively, the air bag mounting interior trim may be applied to an air bag device for vehicle, the air bag device being disposed to a lateral side with respect to the target occupant.

SECOND EMBODIMENT

Figure 6:
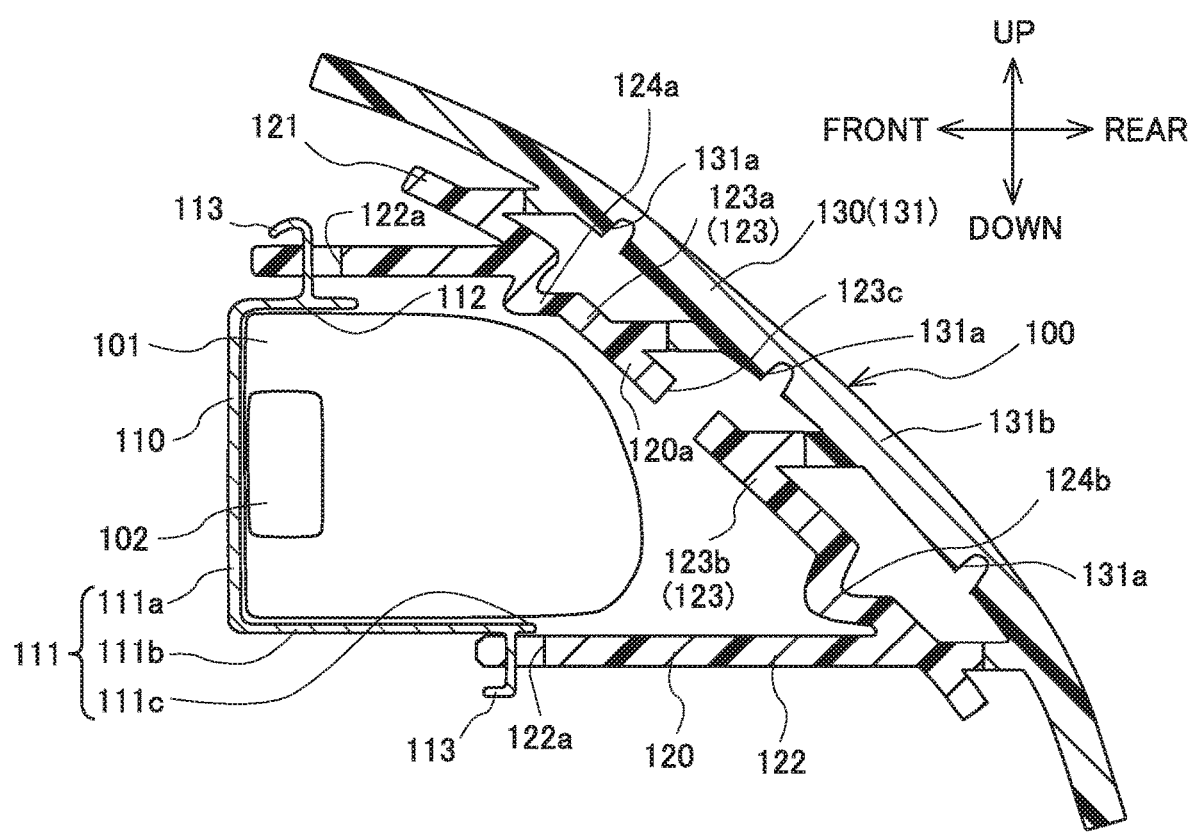
FIG. 6 is a cross-sectional view of an air bag mounting interior trim according to a second embodiment of the present invention.

An air bag mounting interior trim 100 of a second embodiment is an interior product applied to an air bag device for vehicles. The air bag mounting interior trim 100 is a panel member holding an air bag 101, the panel member being configured to tear open at the time of deployment of the air bag 101. As shown in FIG. 6, the air bag mounting interior trim 100 includes a case 110, a retainer 120, and an instrument panel 130.

The air bag 101 is a bag-shaped sheet member for protecting an occupant siting on a seat of a vehicle. The air bag 101 is disposed to the front with respect to a target occupant. Gas generated by an inflator 102 at the time of deployment is supplied into the air bag 101. An external control device (not shown) is electrically connected to the inflator 102. When a deployment signal for causing the air bag 101 to be inflated to be deployed is inputted from the control device, the inflator 102 generates high pressure gas and supplies the high pressure gas into the air bag 101. By being supplied with the gas from the inflator 102, the air bag 101 is inflated to be deployed rearward, thereby to protect the occupant.

The case 110 is a housing member housing the air bag 101 before being inflated to be deployed. The case 110 is formed in a box shape so as to house the folded air bag 101. The case 110 has a body portion 111 composed of a bottom wall 111a, a side wall 111b, and an opening 111c.

The side wall 111b is a tube portion formed in a tubular shape. One end side of the side wall 111b is closed by the bottom wall 111a. The bottom wall 111a and the side wall 111*b* forma housing space 112 in which all or part of the folded air bag 101 is housed. The air bag 101 is housed in the housing space 112 in a state where a proximal portion of the air bag 101 is fixed to the bottom wall 111*a* of the body portion 111 of the case 110. The inflator 102 is fixed to the case 110 through a fixing component.

The opening 111*c* is provided at the other end side of the side wall 111*b*, and is opposed to the bottom wall 111*a*, at the side at which the air bag 101 is to be deployed. The case 110 is disposed such that, in the body portion 111, the opening 111*c* is located to the side where the occupant of the vehicle sits (specifically, rear side), i.e., such that the housed air bag 101 is deployed through the opening 111*c* to the inner side of the compartment.

The case 110 further includes an engagement portion 113. The engagement portion 113 is formed integrally with the body portion 111. The engagement portion 113 is a claw portion provided at an end portion at the opening 111*c* side of the side wall 111*b* of the body portion 111, so as to protrude to the radially outer side of the side wall 111*b*. The engagement portion 113 is provided at a plurality of positions (for example, one at each of an upper position and a lower position) in the body portion 111. Each engagement portion 113 is a part for mounting and fixing the case 110 to the retainer 120, by being engaged with the retainer 120.

The retainer 120 is a holding member holding the case 110 housing the air bag 101. The retainer 120 is a member for mounting the air bag 101 to the back surface side, opposite to the surface at the inner side (i.e., rear side) of the compartment, of the instrument panel 130. The retainer 120 is formed from resin. Examples of the material of the retainer 120 include polyolefin-based soft resin (TPO), super olefin polymer (TSOP), and filler-containing polypropylene-based hard resin (PPF). The retainer 120 has a structure in which a base portion 121, a tube portion 122, and a lid portion 123 are integrally formed through injection molding or the like.

The base portion 121 is a fixation portion to be joined and fixed to the back surface of the instrument panel 130. The base portion 121 is formed in a frame shape. The technique of fixing the base portion 121 and the instrument panel 130 to each other is described later in detail. The tube portion 122 is formed in a frame shape so as to extend forward from the back surface (i.e., front face) of the base portion 121, and holds the case 110 at the inner peripheral side thereof. The lid portion 123 is formed so as to cover the inside of the frame of the base portion 121 having the frame shape, and rotates so as to open by being pressed at the time of the air bag 101 being inflated to be deployed.

The peripheral wall of the tube portion 122 includes an engagement hole 122*a* formed therein. The engagement hole 122*a* is provided by the number that corresponds to the number of the engagement portions 113 of the case 110. The engagement portions 113 of the case 110 are engaged with the engagement holes 122*a*, respectively. By the engagement portions 113 being engaged with the engagement holes 122*a* of the tube portion 122, the case 110 is held by the retainer 120.

The lid portion 123 has two flaps 123*a* and 123*b*. The flaps 123*a* and 123*b* are each a plate-like member formed in a rectangular shape, for example, and are disposed such that an opening 123*c* is formed between the flap 123*a* and the flap 123*b*. The upper edge of the flap 123*a* is coupled to an upper frame portion of the base portion 121 through a hinge portion 124*a*. The lower edge of the flap 123*b* is coupled to a lower frame portion of the base portion 121 through a hinge portion 124*b*. The opening 123*c* is a horizontally extending slit hole portion. The lid portion 123 is not limited to a lid portion of a double-swinging type, and may be a lid portion of a single swinging type having a single flap. Alternatively, the number of the flaps of the lid portion 123 may be 3 or greater.

The hinge portion 124*a* couples the flap 123*a* to the inner edge of the base portion 121 in a state where the flap 123*a* is rotatable about the upper edge of the flap 123. The hinge portion 124*b* couples the flap 123*b* to the inner edge of the base portion 121 in a state where the flap 123*b* is rotatable about the lower edge of the flap 123*b*. Each of the hinge portions 124*a* and 124*b* extends in a strip shape along in the left-right direction, and is formed in a U-shape in cross section. The hinge portions 124*a* and 124*b* are each disposed in a state where the open side of the U-shaped groove in cross section faces rearward, such that the flaps 123*a* and 123*b* are less likely to rotate toward the front side under pressing force applied from the rear side toward the front side, and such that the flaps 123*a* and 123*b* easily rotate toward the rear side under pressing force applied from the front side toward the rear side. The hinge portions 124*a* and 124*b* are each formed from elastomer, for example.

In the structure of the lid portion 123 described above, when the air bag 101 housed in the case 110 held by the retainer 120 is inflated to be deployed, the flap 123*a* is pressed from the front side toward the rear side to be rotated about the upper edge of the flap 123*a*, and the flap 123*b* is pressed from the front side toward the rear side to be rotated about the lower edge of the flap 123*b*, as a result of the inflation and deployment of the air bag 101. Due to the rotations of the flaps 123*a* and 123*b*, the lid portion 123 opens wide from the opening 123*c* at the center thereof.

That is, the retainer 120 has the lid portion 123 and the base portion 121 defining the side, at which the air bag 101 is to be deployed, of the housing space 112 of the case 110 housing the air bag 101, and the retainer 120 is formed such that a part (specifically, opening 123*c*) of the lid portion 123 opens.

The instrument panel 130 is a plate-like member to be used as an interior material for the compartment (cabin) of a vehicle. The instrument panel 130 is provided at a position opposed to the upper body of an occupant sitting at a passenger seat, for example. The retainer 120 is fixed to the back surface (i.e., front face) of the instrument panel 130. The instrument panel 130 has a panel base member 131. The instrument panel 130 is not limited to an instrument panel composed only of the panel base member 131, and may include a cushioning member and a skin member.

The panel base member 131 is a plate-like member formed from resin. Examples of the material of the panel base member 131 include polyolefin-based soft resin (TPO), super olefin polymer (TSOP), and filler-containing polypropylene-based hard resin (PPF). The material of the panel base member 131 may be different from the material of the retainer 120. The panel base member 131 is curved so as to protrude toward the inner side of the compartment, and is formed so as to be inclined with respect to the horizontal direction from an upper front portion thereof to a lower rear portion thereof. The retainer 120 is curved in accordance with the curved shape of the panel base member 131, and is formed so as to be inclined from an upper front portion thereof to a lower rear portion thereof. The panel base member 131 is disposed so as to be opposed to the base portion 121 and the lid portion 123 of the retainer 120, at the side where the air bag 101 is to be deployed.

The panel base member 131 has tear lines 131*a* formed therein. The tear lines 131*a* are provided at positions corresponding to peripheral edges of the flaps 123a and 123b of the lid portion 123 of the retainer 120 fixed to the panel base member 131. The tear lines 131a allow the panel base member 131 to easily tear open in the form of two doors at the time of inflation and deployment of the air bag 101.

The panel base member 131 is welded to the base portion 121 and the lid portion 123 of the retainer 120, thereby being joined and fixed to the retainer 120. Specifically, the retainer 120 and the panel base member 131 of the instrument panel 130 are welded to each other through infrared welding. Infrared welding is performed by use of an infrared welding machine (not shown). The infrared welding is a type of welding in which: infrared radiation is applied from an infrared welding machine to the retainer 120 and the panel base member 131 to transfer heat in non-contact manner, thereby plasticizing the retainer 120 and the panel base member 131, and then, the molten retainer 120 and the molten panel base member 131 are resolidified in a pressurized state to be joined together.

The base portion 121 and the lid portion 123 of the retainer 120 are curved so as to protrude toward the inner side of the compartment. The base portion 121 and the lid portion 123 of the retainer 120 have an inclined face 120a inclined with respect to the horizontal direction and extending from an upper front portion thereof to a lower rear portion thereof. The inclination angle of the inclined face 120a may be varied depending on the part of the retainer 120 and in accordance with the curved degree thereof. The base portion 121 and the lid portion 123 of the retainer 120 are formed so as to have substantially the same thickness throughout the entire region thereof. The inclined face 120a is formed such that the normal at the rear face side (surface side) thereof is directed rearward and obliquely upward and the normal at the front face side (back surface side) thereof is directed forward and obliquely downward.

The retainer 120 and the panel base member 131 of the instrument panel 130 are moved relative to each other in a substantially horizontal direction at the time of assembly for welding, and are pressurized in a state where the retainer 120 and the panel base member 131 are in contact with each other. The pressurizing direction at the time of assembly of the retainer 120 and the panel base member 131 is a substantially horizontal direction. The retainer 120 and the panel base member 131 are welded to each other in a state where the retainer 120 and the panel base member 131 are pressurized in the substantially horizontal direction. The inclined face 120a of the retainer 120 described above is inclined with respect to the pressurizing direction realized at the time of assembly of the retainer 120 and the panel base member 131.

Figure 7:
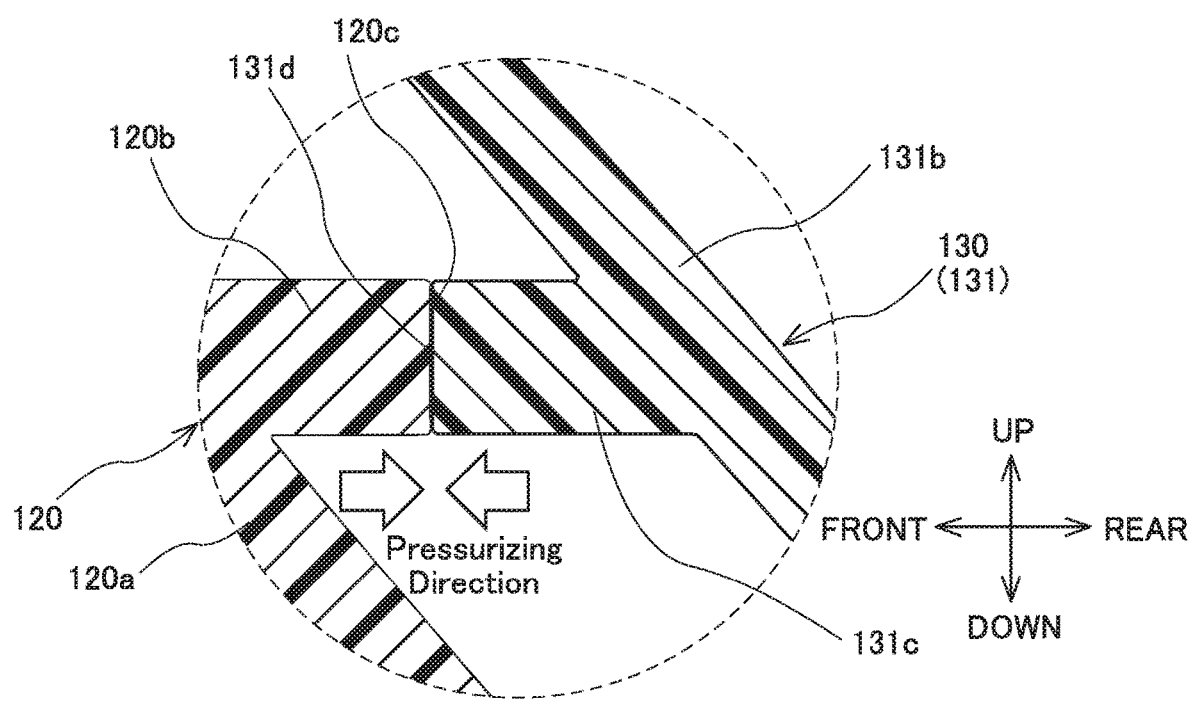
FIG. 7 is a cross-sectional view of a main part of the air bag mounting interior trim according to the second embodiment.

As shown in FIG. 7, the retainer 120 includes ribs 120b. The ribs 120b are provided at the rear face side (i.e., surface side) of the base portion 121 and the lid portion 123 of the retainer 120. The ribs 120b linearly protrude from the base portion 121 and the lid portion 123 toward the panel base member 131 side along the pressurizing direction described above, and extend along the vehicle width direction in the protruding state. The ribs 120b are provided in a multiple number, and are disposed substantially evenly throughout the entire region of the base portion 121 and the lid portion 123. The ribs 120b include ribs that protrude from the inclined face 120a of the base portion 121 and the lid portion 123 (FIG. 6 shows such ribs at four positions), and ribs that protrude from a face not being the inclined face 120a. Each rib 120b has a weld end face 120c of which normal extends in the pressurizing direction described above. The weld end face 120c is a face extending in a direction perpendicular to the pressurizing direction described above.

The panel base member 131 is curved so as to protrude toward the inner side of the compartment. The panel base member 131 has an inclined face 131b inclined with respect to the horizontal direction and extending from an upper front portion thereof to a lower rear portion thereof. The inclination angle of the inclined face 131b may be varied depending on the part of the panel base member 131 and in accordance with the curved degree thereof. The panel base member 131 is formed so as to have substantially the same thickness throughout the entire region thereof. The inclined face 131b is formed such that the normal at the rear face side (surface side) thereof is directed rearward and obliquely upward and the normal at the front face side (back surface side) thereof is directed forward and obliquely downward. The inclined face 131b is inclined with respect to the pressurizing direction realized at the time of assembly of the retainer 120 and the panel base member 131.

As shown in FIG. 7, the panel base member 131 includes ribs 131c. The ribs 131c are provided at the front face side (i.e., back surface side) of the panel base member 131. The ribs 131c linearly protrude from the panel base member 131 toward the retainer 120 side along the pressurizing direction described above, and extend along the vehicle width direction in the protruding state. The ribs 131c are provided in a multiple number so as to realize one-to-one correspondence with the ribs 120b of the retainer 120, and are disposed substantially evenly throughout the entire region of the panel base member 131. The ribs 131c includes ribs that protrude from the inclined face 131b (FIG. 6 shows such ribs at four positions), and ribs that protrude from a face not being the inclined face 131b. Each rib 131c has a weld end face 131d of which normal extends in the pressurizing direction described above. The weld end face 131d is a face extending in a direction perpendicular to the pressurizing direction described above.

The weld end face 120c of each rib 120b of the retainer 120 and the weld end face 131d of a corresponding rib 131c of the panel base member 131 of the instrument panel 130 face each other in parallel to each other. The direction in which the weld end face 120c and the weld end face 131d face each other is aligned with the pressurizing direction in which the retainer 120 and the panel base member 131 are moved relative to each other at the time of assembly thereof, to be brought into contact with each other and pressurized.

A production method for the air bag mounting interior trim 100 of the present embodiment is described.

First, the retainer 120 having the base portion 121 and the lid portion 123 which define the side, at which the air bag 101 is to be deployed, of the housing space 112 of the case 110 housing the air bag 101 is prepared, and the panel base member 131, of the instrument panel 130, to be welded to the retainer 120 is prepared. Then, the temperatures of the leading ends of the ribs 120b and 131c of the retainer 120 and the panel base member 131 are raised to a predetermined temperature to be melted by an infrared welding machine. Next, by use of a jig, the retainer 120 and the panel base member 131 each having the molten leading ends are moved relative to each other in a horizontal direction (pressurizing direction) in which the retainer 120 and the panel base member 131 come closer to each other, whereby the weld end faces 120c and the weld end faces 131d of the ribs 120b and the ribs 131c are brought into contact with each other in a direction perpendicular to the weld end faces 120c and 131d, and pressurized. By this technique, the air bag mounting interior trim 100 having the ribs 120b and the ribs 131c of the retainer 120 and the instrument panel 130 welded to each other through infrared welding is produced.

Next, operation of the air bag mounting interior trim 100 of the present embodiment is described.

In the air bag mounting interior trim 100, when the air bag 101 is inflated to be deployed by being supplied with gas from the inflator 102, the lid portion 123 of the retainer 120 rotates so as to open by being pressed from the back surface side thereof toward the surface side thereof, first. Then, when this rotation of the lid portion 123 occurs, the instrument panel 130 tears open along the tear lines 131a of the panel base member 131 due to the rotation, whereby the air bag 101 expands into the compartment through the gap generated as a result of the tear-opening. Thus, the air bag 101 having expanded into the compartment protects the occupant of the vehicle.

In the air bag mounting interior trim 100 of the present embodiment, the retainer 120 holding the case 110 housing the air bag 101, and the instrument panel 130 configured to have the retainer 120 mounted thereto are joined to each other through infrared welding. The infrared welding is performed in a state in which: the weld end face 120c of each rib 120b of the retainer 120 and the weld end face 131d of a corresponding rib 131c of the panel base member 131 of the instrument panel 130 face each other in parallel to each other; and the facing direction is aligned with the pressurizing direction in which the retainer 120 and the panel base member 131 are moved relative to each other at the time of assembly thereof.

In this structure, all of the ribs 120b and 131c including the ribs 120b and 131c formed at the inclined faces 120a and 131b of the retainer 120 and the panel base member 131 have the weld end faces 120c and 131d facing the pressurizing direction in which the retainer 120 and the panel base member 131 are moved relative to each other at the time of assembly thereof. That is, the weld end faces 120c and 131d of all of the ribs 120b and 131c are the faces each extending in a direction perpendicular to the pressurizing direction realized at the time of assembly of the retainer 120 and the panel base member 131. Thus, the weld end faces 120c and 131d of the ribs 120b and 131c (especially, the ribs 120b and 131c formed at the inclined faces 120a and 131b) are not the faces each extending inclined with respect to the pressurizing direction described above. Thus, each weld end face 120c and a corresponding weld end face 131d are prevented from being pressurized in a direction inclined with respect to the weld end face 120c and the weld end face 131d at the time of welding thereof, and are pressurized in a direction perpendicular to the weld end face 120c and the weld end face 131d.

Therefore, according to the air bag mounting interior trim 100 of the present embodiment, even in a case where the ribs 120b and 131c for welding the retainer 120 and the instrument panel 130 are formed at the inclined faces 120a and 131b each having a large inclination angle with respect to the vertical direction, welding pressure necessary for welding the retainer 120 and the instrument panel 130 is caused to efficiently act between the weld end faces 120c and the weld end faces 131d, and welding of the ribs 120b and the ribs 131c is reliably performed in an appropriately pressurized state. That is, the ribs 120b and the ribs 131c including the ribs provided at the inclined faces 120a and 131b of the retainer 120 and the instrument panel 130 are efficiently pressurized to be welded to each other.

In addition, since the retainer 120 and the panel base member 131 of the instrument panel 130 are joined to each other through infrared welding, the retainer 120 and the panel base member 131 are reliably integrated to each other.

In the second embodiment described above, the base portion 121 and the lid portion 123 of the retainer 120 correspond to "first wall portion" described in claims, the panel base member 131 of the instrument panel 130 corresponds to "second wall portion" described in claims, each rib 120b of the retainer 120 corresponds to "first rib" described in claims, and each rib 131c of the panel base member 131 of the instrument panel 130 corresponds to "second rib" described in claims.

Meanwhile, in the second embodiment described above, the retainer 120 and the instrument panel 130 are joined to each other through infrared welding. However, as long as welding allows joining of the ribs 120b of the retainer 120 and the ribs 131c of the panel base member 131 of the instrument panel 130, the welding employed in the present invention is not limited to infrared welding, and may be another type of welding such as ultrasonic welding, high frequency welding, laser welding, or vibration welding.

In the second embodiment described above, each rib 120b of the retainer 120 and a corresponding rib 131c of the panel base member 131 of the instrument panel 130, both ribs 120b, 131c melted by infrared radiation, are welded to each other by the weld end face 120c and the weld end face 131d being pressurized while being in contact with each other in a direction perpendicular to the weld end face 120c and the weld end face 131d. In a structure (contrast structure) where the rib width of the rib 120b and the rib width of the rib 131c are not different from each other and the leading end shapes of the ribs 120b and 131c are not pointed shapes, the weld end face 120c and weld end face 131d are pressed under substantially uniform pressure throughout the entire region of the contact surface if infrared welding is performed as described above. When the entire region of the contact surface is pressed under substantially uniform pressure, the leading end of one of the rib 120b and the rib 131c is difficult to go into the weld end face 120c or 131d of the other of the rib 120b and the rib 131c to form a recessed portion therein. Thus, in the structure described above, the contact area of the leading ends of the rib 120b and the rib 131c is not ensured, and the leading end of one of the rib 120b and the rib 131c is not surrounded by the other of the rib 120b and the rib 131c. Thus, the welding strength or the joining strength between the rib 120b and the rib 131c remains small.

Thus, in order to improve the welding strength or the joining strength between each rib 120b and a corresponding rib 131c of the retainer 120 and the panel base member 131, the rib 120b and the rib 131c may be welded to each other in a state where the leading end of either one of the rib 120b and the rib 131c is fitted in a recessed portion formed in the weld end face 120c or 131d of the other of the rib 120b and the rib 131c.

Figure 8:
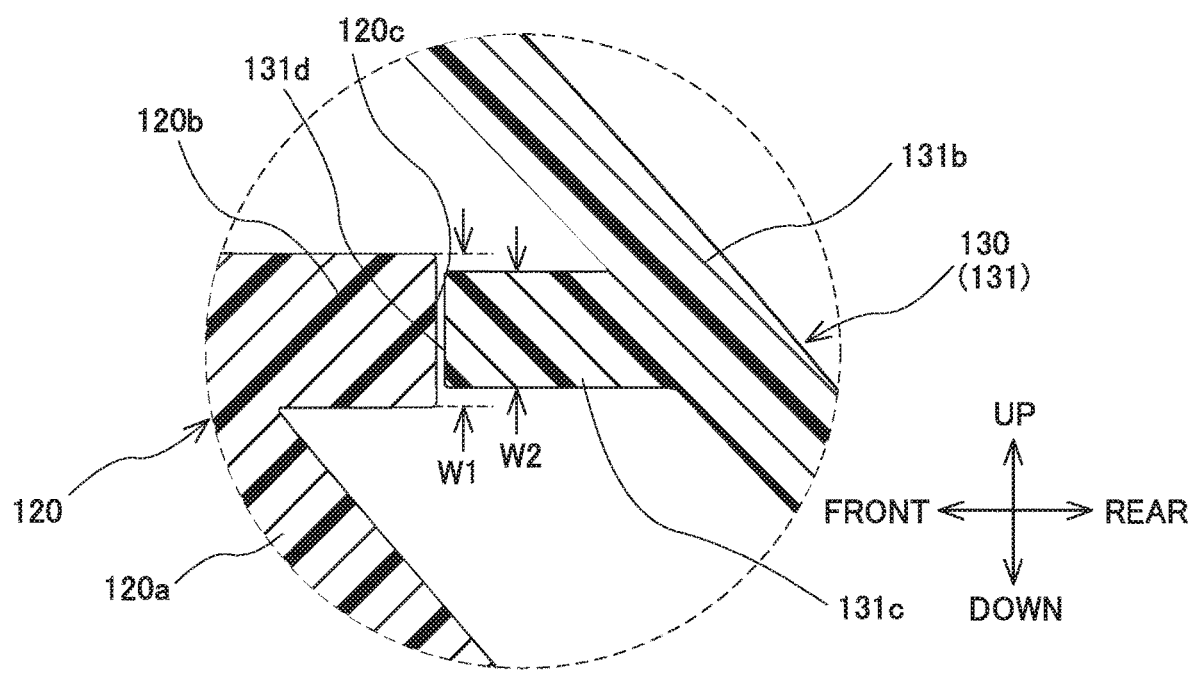
FIG. 8 is a cross-sectional view of a main part of an air bag mounting interior trim immediately before welding according to a first modification of the present invention.

For example, as shown in FIG. 8, the retainer 120 and the panel base member 131 of the instrument panel 130 are formed such that a rib width W2 of the rib 131c of the panel base member 131 is smaller than a rib width W1 of the rib 120b of the retainer 120. The rib width W1, W2 is the dimension in a direction perpendicular to the protruding direction of the rib 120b, 131c, and specifically is the dimension in the up-down direction of the rib 120b, 131c. For example, the rib width W1 is about 1.5 mm, and the rib width W2 is about 2.5 mm. The difference between the rib width W1 and the rib width W2 may be about 1 mm.

Next, the leading ends of each rib 120b and each rib 131c of the retainer 120 and the panel base member 131 are melted by an infrared welding machine. Next, by use of a jig, the retainer 120 and the panel base member 131 each having the molten leading ends are moved relative to each other in a horizontal direction (pressurizing direction) in which the retainer 120 and the panel base member 131 come closer to each other, whereby the weld end face 120c and the weld end face 131d of the rib 120b and the rib 131c are brought into contact with each other in a direction perpendicular to the weld end face 120c and the weld end face 131d, and pressurized.

Figure 9:
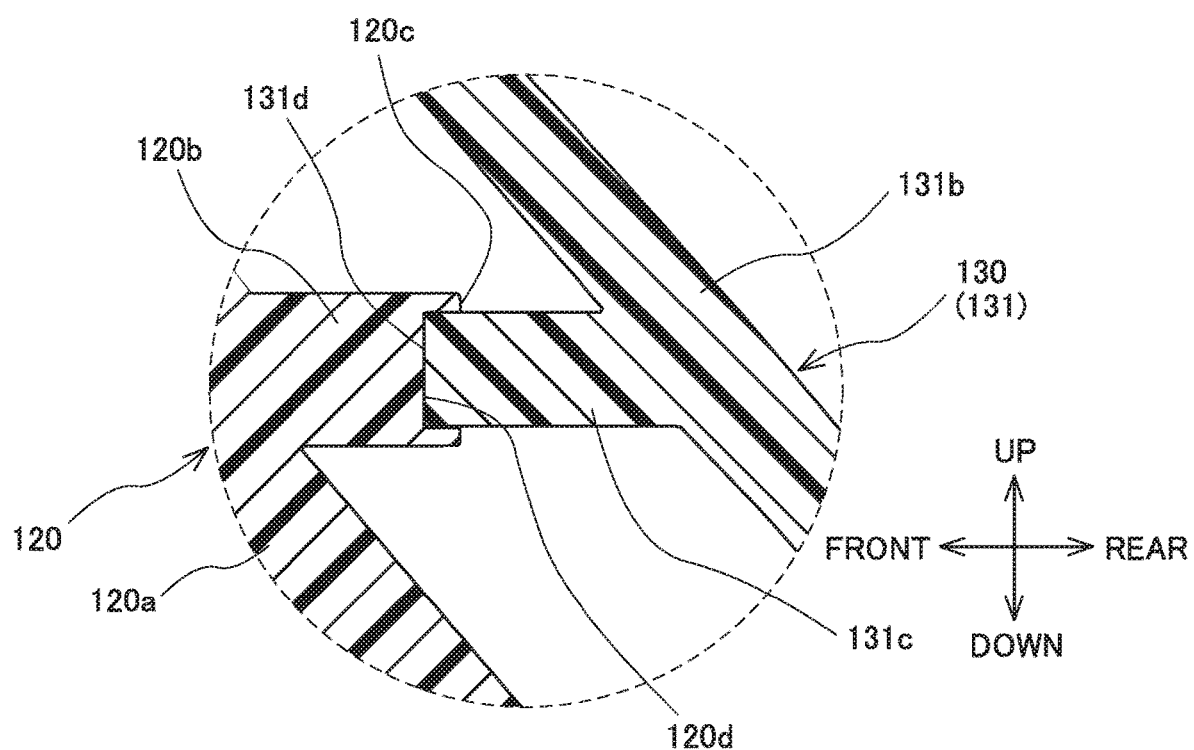
FIG. 9 is a cross-sectional view showing the main part of the air bag mounting interior trim shown in FIG. 8 at the time of completion of the welding.

When the rib 120b and the rib 131c are pressurized as above, the rib 131c, of the panel base member 131, having a smaller rib width presses a part of the weld end face 120c of the rib 120b, of the retainer 120, having a greater rib width, whereby stress is concentrated. Thus, as shown in FIG. 9, a recessed portion 120d is formed in the weld end face 120c of the molten rib 120b, and at the same time, the leading end of the rib 131c enters the recessed portion 120d to be fitted therein. At this time, the rib 120b and the rib 131c are welded to each other in a state where the leading end of the rib 131c is fitted in the recessed portion 120d formed in the weld end face 120c of the rib 120b. Thus, in the structure of this modification, the contact area between the leading ends of the rib 120b and the rib 131c is increased and the leading end of one of the rib 120b and the rib 131c is caused to be surrounded by the other of the rib 120b and the rib 131c. Thus, the welding strength or the joining strength between the rib 120b and the rib 131c is improved. Thus, the rib 120b and the rib 131c are further efficiently pressurized to be welded to each other.

Figure 10:
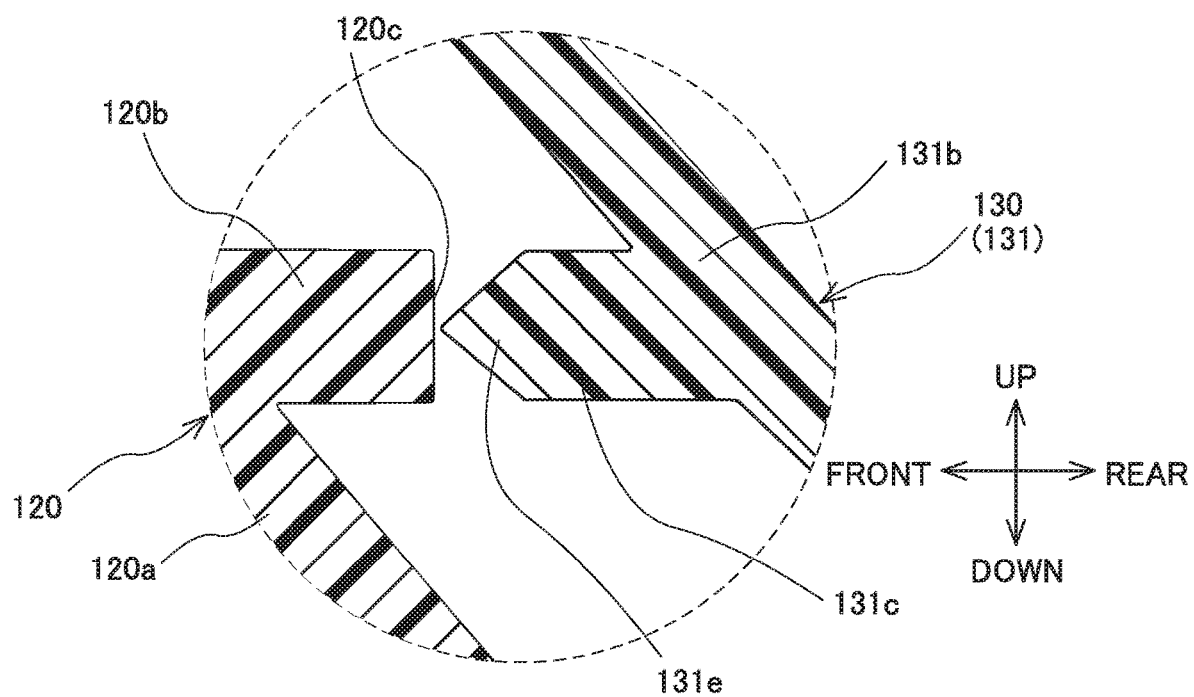
FIG. 10 is a cross-sectional view of a main part of an air bag mounting interior trim immediately before welding according to a second modification of the present invention.

Alternatively, for example, as shown in FIG. 10, the panel base member 131 of the instrument panel 130 is formed such that each rib 131c thereof has a pointed end portion 131e at the leading end thereof. Then, the leading ends of each rib 120b and each rib 131c of the retainer 120 and the panel base member 131 are melted by an infrared welding machine. Next, by use of a jig, the retainer 120 and the panel base member 131 each having the molten leading ends are moved relative to each other in a horizontal direction (pressurizing direction) in which the retainer 120 and the panel base member 131 come closer to each other, whereby the weld end face 120c of the rib 120b and the outer face of the pointed end portion 131e of the rib 131c are brought into contact with each other in a direction perpendicular to the weld end face 120c, and pressurized.

Figure 11:
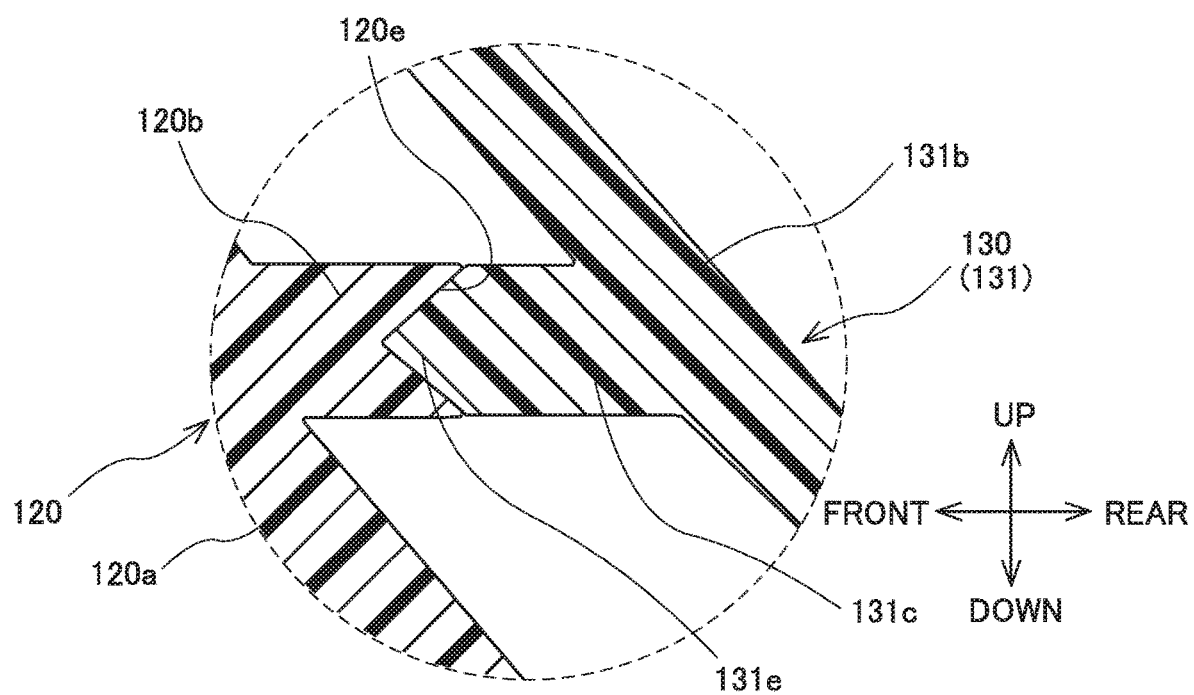
FIG. 11 is a cross-sectional view of the main part of the air bag mounting interior trim shown in FIG. 10 at the time of completion of the welding.

When the rib 120b and the rib 131c are pressurized as above, the pointed end portion 131e of the rib 131c ununiformly presses the weld end face 120c of the rib 120b, whereby stress is concentrated. Thus, as shown in FIG. 11, a recessed portion 120e is formed in the weld end face 120c of the molten rib 120b, and at the same time, the pointed end portion 131e of the rib 131c enters the recessed portion 120e to be fitted therein. In this case, the rib 120b and the rib 131c are welded to each other in a state where the pointed end portion 131e of the rib 131c is fitted in the recessed portion 120e formed in the weld end face 120c of the rib 120b. Thus, also in the structure of this modification, the contact area between the leading ends of the rib 120b and the rib 131c is increased and the leading end of one of the rib 120b and the rib 131c is caused to be surrounded by the other of the rib 120b and the rib 131c. Thus, the welding strength or the joining strength between the rib 120b and the rib 131c is improved. Thus, the rib 120b and the rib 131c are further efficiently pressurized to be welded to each other.

In the modification shown in FIG. 10 and FIG. 11 described above, the rib width is not different between the rib 120b of the retainer 120 and the rib 131c of the panel base member 131. However, the modification shown in FIG. 10 and FIG. 11 may be combined with the modification shown in FIG. 8 and FIG. 9 described above to provide a difference in the rib width between the rib 120b and the rib 131c, thereby further improving the welding strength or the joining strength between the rib 120b and the rib 131c.

When each rib 120b and a corresponding rib 131c of the retainer 120 and the panel base member 131 are to be welded to each other in a state where the leading end of either one of the rib 120b and the rib 131c is fitted in a recessed portion formed in the weld end face 120c or 131d of the other of the rib 120b and the rib 131c, the leading end of the rib 131c of the panel base member 131 may be fitted in the recessed portion in the weld end face 120c of the rib 120b of the retainer 120 as in the two modifications shown in FIG. 8 to FIG. 11 described above, but instead, the leading end of the rib 120b of the retainer 120 may be fitted in a recessed portion in the weld end face 131d of the rib 131c of the panel base member 131.

In order to appropriately perform welding of each rib 120b and a corresponding rib 131c of the retainer 120 and the panel base member 131, the rib 120b, 131c of which material has a great hardness during pressurization is effectively used as the rib 120b, 131c having a smaller rib width or having a pointed leading end, and the rib 131c, 120b of which material has a small hardness during pressurization is effectively used as the rib 131c, 120b having a greater rib width or having a flat leading end face. The reason is that the rib 120b, 131c of which material has a great hardness during pressurization easily goes into the weld end face 131d, 120c of the rib 131c, 120b of which material has a small hardness during pressurization, and thus, the rib 120b and the rib 131c are easily joined to each other. Examples of the material having a great hardness include super olefin polymer (TSOP) and filler-containing polypropylene-based hard resin (PPF), and examples of the material having a small hardness include polyolefin-based soft resin (TPO).

In order to improve the welding strength or the joining strength between each rib 120b and a corresponding rib 131c of the retainer 120 and the panel base member 131, the technique of welding the rib 120b and the rib 131c to each other in a state where the leading end of either one of the rib 120b and the rib 131c is fitted in the recessed portion formed in the weld end face 120c or 131d of the other of the rib 120b and the rib 131c as in the two modifications shown in FIG. 8 to FIG. 11 described above may be applied to the configuration of the first embodiment described above.

In the second embodiment described above, the air bag mounting interior trim 100 is assumed to be applied to an air bag device for vehicles, the air bag device being configured such that the air bag 101 is housed at the front side with respect to the instrument panel 130 present forward of the occupant, i.e., the air bag 101 is disposed forward of the target occupant, and the target occupant is protected by the air bag 101 being inflated to be deployed to the rear side (to the inner side of the compartment). However, the present invention is not limited thereto, and may be applied to an air bag device for vehicle, the air bag device being configured such that the air bag is housed at a lateral side with respect to a left/right door trim panel of the vehicle body, and the target occupant is protected by the air bag being inflated to be deployed to the lateral side (to the inner side of the compartment).

The present invention is not limited to the embodiments and the modifications described above, and can be modified in various manners without departing from the gist of the present invention.

The embodiments and the modifications described above include the following inventions.

[Additional Note 1]

An air bag mounting interior trim comprising:

a retainer having mounted thereto a case housing an air bag, the retainer having a first wall portion disposed at a deployment side with respect to the air bag; and a panel having a second wall portion disposed so as to be opposed to the first wall portion of the retainer, at the deployment side of the air bag with respect to the first wall portion, the panel configured to be welded to the retainer, wherein the first wall portion and the second wall portion each have an inclined face inclined with respect to a pressurizing direction in which the retainer and the panel are moved relative to each other at a time of assembly thereof for welding, the retainer has a first rib protruding along the pressurizing direction from the inclined face of the first wall portion toward the panel side, the panel has a second rib protruding along the pressurizing direction from the inclined face of the second wall portion toward the retainer side, and the first rib and the second rib are welded to each other in a state where a leading end of either one of the first rib and the second rib is fitted in a recessed portion formed in a weld end face of the other of the first rib and the second rib.

According to the configuration of Additional Note 1, the retainer is provided with the first rib protruding along the pressurizing direction from the inclined face thereof toward the panel side, and the panel is provided with the second rib protruding along the pressurizing direction from the inclined face thereof toward the retainer side. The first rib and the second rib are welded to each other in a state where the leading end of either one of the first rib and the second rib is fitted in a recessed portion formed in the weld end face of the other of the first rib and the second rib. In such a welded structure, the leading end of either one of the first rib and the second rib enters the recessed portion in the weld end face of the other of the first rib and second rib. Accordingly, the contact area between the ribs is increased, and the leading end of one of the ribs is surrounded by the other of the ribs. Thus, the welding strength or the joining strength between the ribs is increased. Thus, the ribs of the retainer and the panel are efficiently pressurized to be welded to each other.

[Additional Note 2]

The air bag mounting interior trim according to Additional Note 1, wherein the first rib and the second rib are joined to each other through infrared welding. According to the configuration of Additional Note 2, the retainer and the panel are reliably integrated to each other.

[Additional Note 3]

The air bag mounting interior trim according to Additional Note 1 or 2, wherein the one of the first rib and the second rib has a rib width smaller than a rib width of the other of the first rib and the second rib. According to the configuration of Additional Note 3, during pressurization of the ribs, the rib having a smaller rib width presses a part of the rib having a greater rib width, whereby stress is concentrated. Thus, the ribs are welded to each other in a state where the rib having a smaller rib width is fitted in the recessed portion formed in the weld end face of the rib having a greater rib width. Accordingly, the contact area between the leading ends of the ribs is increased, and the welding strength or the joining strength between the ribs is improved.

[Additional Note 4]

The air bag mounting interior trim according to any one of Additional Notes 1 to 3, wherein the one of the first rib and the second rib has a pointed end portion at the leading end thereof. According to the configuration of Additional Note 4, during pressurization of the ribs, the pointed end portion of the one of the ribs ununiformly presses the weld end face of the other of the ribs, whereby stress is concentrated. Thus, the ribs are welded to each other in a state where the rib having the pointed end portion is fitted in the recessed portion formed in the weld end face of the other of the ribs. Thus, the contact area between the leading ends of the ribs is increased, and thus, the welding strength or the joining strength between the ribs is improved.

[Additional Note 5]

The air bag mounting interior trim according to any one of Additional Notes 1 to 4, wherein a material of the one of the first rib and the second rib is filler-containing polypropylene-based hard resin (PPF), and a material of the other of the first rib and the second rib is polyolefin-based soft resin (TPO). According to the configuration of Additional Note 5, since PPF is a material having a greater hardness during pressurization than TPO, the one of the ribs is easily caused to go into the weld end face of the other of the ribs during pressurization of the ribs, and the ribs are easily joined to each other.

[Additional Note 6]

An air bag mounting interior trim production method in which the retainer and the panel of the air bag mounting interior trim according to any one of Additional Notes 1 to 5 are assembled to each other, the production method comprising:

a first step of melting, by means of an infrared welding machine, the leading end of the first rib of the retainer and the leading end of the second rib of the panel; and a second step of, by use of a jig, moving the retainer and the panel relative to each other in the pressurizing direction in which the retainer and the panel come closer to each other, to bring the first rib and the second rib into contact with each other and pressurize the first rib and the second rib, thereby to cause the leading end of the one of the first rib and the second rib to be fitted in the recessed portion of the other of the first rib and the second rib.

According to the configuration of Additional Note 6, the retainer and the panel are welded to each other in a state where the leading end of either one of the first rib and the second rib is fitted in the recessed portion in the weld end face of the other of the first rib and the second rib. Thus, the ribs of the retainer and the panel are efficiently pressurized to be welded to each other.

The invention claimed is:

1. An air bag mounting interior trim comprising:

a retainer having mounted thereto a case housing an air bag, the retainer having a first wall portion disposed at a deployment side with respect to the air bag; and a panel having a second wall portion disposed so as to be opposed to the first wall portion of the retainer, at the deployment side of the air bag with respect to the first wall portion, the panel configured to be welded to the retainer, wherein the first wall portion and the second wall portion each have an inclined face inclined with respect to a pressurizing direction in which the retainer and the panel are moved relative to each other at a time of assembly thereof for welding, the retainer has a first rib protruding along the pressurizing direction from the inclined face of the first wall portion toward the panel, the panel has a second rib configured to be welded to the first rib, the second rib protruding along the pressurizing direction from the inclined face of the second wall portion toward the retainer, and the first rib and the second rib respectively have a same width and weld end faces, the weld end faces of the first and second ribs face each other, are parallel to each other and extend orthogonally relative to the pressurizing direction; and the weld end faces of the first and second ribs have matching contact surface areas and are welded together without one of the weld end faces surrounding another of the weld end faces.

2. An air bag mounting interior trim according to claim 1, wherein the retainer includes a lid composed of two flaps, the panel is located to a rear side of the flaps, the panel has an opening portion including two doors respectively being regions defined by tear lines provided at positions corresponding to borders of the flaps, and the panel is welded to the flaps, the first rib protrudes rearward along the pressurizing direction from a face at a rear side of each flap, and the first rib extends in a vehicle width direction and the weld end face of the first rib is formed as a perpendicular plane extending in a direction orthogonal to the pressurizing direction, and the second rib protrudes forward along the pressurizing direction at a time of assembly for welding from a face at a front side, with respect to the panel, of the opening portion, and the second rib extends in the vehicle width direction, the weld end face of the second rib is formed as the perpendicular plane, and the second rib is welded to the weld end face of the first rib.

3. The air bag mounting interior trim according to claim 2, wherein the panel is inclined with respect to the weld end faces of the first rib and the second rib.

4. The air bag mounting interior trim according to claim 3, wherein the retainer has a frame portion extending forward along the pressurizing direction from the flaps.

5. The air bag mounting interior trim according to claim 1, wherein the retainer and the panel are joined to each other through infrared welding.

6. An air bag mounting interior trim production method in which the retainer and the panel of the air bag mounting interior trim according to claim 1 are assembled to each other, the production method comprising:

a first step of melting, by means of an infrared welding machine, a leading end of the first rib of the retainer and a leading end of the second rib of the panel; and a second step of, by use of a jig, moving the retainer and the panel relative to each other in the pressurizing direction in which the retainer and the panel come closer to each other, thereby to bring the first rib and the second rib into contact with each other in a direction perpendicular to the weld end faces and pressurize the first rib and the second rib.

7. An air bag mounting interior trim comprising:

a retainer having mounted thereto a case housing an air bag, the retainer having a first wall portion disposed at a deployment side with respect to the air bag; and a panel having a second wall portion disposed so as to be opposed to the first wall portion of the retainer, at the deployment side of the air bag with respect to the first wall portion, the panel configured to be welded to the retainer, wherein the first wall portion and the second wall portion each have an inclined face inclined with respect to a pressurizing direction in which the retainer and the panel are moved relative to each other at a time of assembly thereof for welding, the retainer has a first weld rib protruding along the pressurizing direction from the inclined face of the first wall portion toward the panel, the first weld rib having an end face extending in the pressurizing direction, the panel has a second weld rib welded to the first weld rib, the weld second rib protruding along the pressurizing direction from the inclined face of the second wall portion toward the retainer, the second weld rib having a pointed end portion extending in the pressurizing direction, and the retainer and the panel are joined to each other through infrared welding with the pointed end portion of the second weld rib being fitted within and welded to the end face of the first weld rib.

8. An air bag mounting interior trim according to claim 7, wherein the retainer includes a lid composed of two flaps, the panel is located to a rear side of the flaps, and the panel has an opening portion including two doors respectively being regions defined by tear lines provided at positions corresponding to borders of the flaps, and the panel is welded to the flaps, the first weld rib protrudes rearward along the pressurizing direction from a face at a rear side of each flap, and the first weld rib extends in the vehicle width direction and the weld end face of the first weld rib is formed as a perpendicular plane extending in a direction orthogonal to the pressurizing direction, and the second weld rib protrudes forward along the pressurizing direction at a time of assembly for welding from a face at a front side, with respect to the panel, of the opening portion, and the second weld rib extends in a vehicle width direction, the weld end face of the second weld rib is formed as the perpendicular plane, and the second weld rib is welded to the weld end face of the first weld rib.

9. The air bag mounting interior trim according to claim 8, wherein the panel is inclined with respect to the weld end faces of the first weld rib and the second weld rib.

10. The air bag mounting interior trim according to claim 9, wherein the retainer has a frame portion extending forward along the pressurizing direction from the flaps.

11. An air bag mounting interior trim production method in which the retainer and the panel of the air bag mounting interior trim according to claim 7 are assembled to each other, the production method comprising:

a first step of melting, by means of an infrared welding machine, a leading end of the first weld rib of the retainer and a leading end of the second weld rib of the panel; and a second step of, by use of a jig, moving the retainer and the panel relative to each other in the pressurizing direction in which the retainer and the panel come closer to each other, thereby to bring the first weld rib and the second weld rib into contact with each other in a direction perpendicular to the weld end faces and pressurize the first weld rib and the second weld rib.

* * * * *